United States Patent [19]

Hopper

[11] 4,146,959

[45] Apr. 3, 1979

[54] DEVICE FOR CUTTING A CYLINDRICAL ARTICLE

[76] Inventor: Thomas P. Hopper, R.F.D. 1, Box 689, Durham, Conn. 06422

[21] Appl. No.: 802,823

[22] Filed: Jun. 2, 1977

[51] Int. Cl.$^2$ .............................. B23D 21/04

[52] U.S. Cl. .............................. 30/95

[58] Field of Search .............. 30/90.8, 91.1, 95, 94, 30/93, 91.2

[56] References Cited

U.S. PATENT DOCUMENTS

| | | | |
|---|---|---|---|
| 717,800 | 1/1903 | Bell | 30/94 |
| 823,796 | 6/1906 | Leyes | 30/95 |
| 1,165,176 | 12/1915 | Hornor | 30/91.1 X |
| 2,615,516 | 10/1952 | Hyde | 30/94 X |
| 2,817,255 | 12/1957 | Lormeau | 30/91.2 |
| 2,869,413 | 1/1959 | Anderson | 30/94 X |
| 2,903,064 | 9/1959 | Blonder | 30/94 X |
| 3,169,315 | 2/1965 | Mankovitz | 30/91.1 X |
| 3,254,407 | 6/1966 | Apa et al. | 30/91.2 |
| 3,688,404 | 9/1972 | Muller | 30/91.2 |
| 3,714,712 | 2/1973 | Hoffman | 30/95 |

FOREIGN PATENT DOCUMENTS

| | | | |
|---|---|---|---|
| 123256 | 3/1913 | Fed. Rep. of Germany | 30/95 |

*Primary Examiner*—Harold D. Whitehead
*Attorney, Agent, or Firm*—St. Onge, Mayers, Steward & Reens

[57] ABSTRACT

A device for cutting a cylindrical article, such as a window shade or the like, comprises a tubular support for encircling the article and a guide mounted with the support for rotation about the support axis. The guide has a radially outwardly projecting arm that is formed to be engaged by an operator. A knife blade, having a cutting edge, is mounted in the guide for movement from a first position with the cutting edge tangentially intersecting the tubular section defined by the support to a second position with the cutting edge chordally intersecting the tubular section. A spring urges the knife from its first to its second position while the guide is rotated about the support.

12 Claims, 8 Drawing Figures

DEVICE FOR CUTTING A CYLINDRICAL ARTICLE

BACKGROUND OF THE INVENTION

1. Field of the Invention

The present invention relates to a device for cutting cylindrical articles such as window shades and the like. Generally, this device is capable of cutting any cylindrical article which is constructed of soft wood, paper, cardboard, or any other material that may readily be cut with a knife. However, this device has particular utility in cutting window shades to the proper size for installation in a window.

Today large numbers of window shades are installed by the purchaser. Typically, he measures the window in which he intends to install the shade and gives the measurements to a sales person at the store where he intends to buy the shade. The sales person or another attendant then cuts the shade to the installer's dimensions. The installer then must complete the installation at the window site.

The process described above has obvious disadvantages. Specifically, if the window is measured incorrectly, and, for example, the shade is cut too short, it is not usuable and must be discarded or used in a smaller window. Problems obviously arise from the fact that cutting is done at a location remote from the window in which the shade is to be installed. Most frequently, the person who does the cutting has never seen the window nor has he taken the measurements himself. Therefore, he has to rely on a person, who often is inexperienced in such matters, for accuracy of measurement.

Errors in sizing a shade properly to a window may be minimized if the shade is measured and cut at the site of the window. The device of the present invention is intended to provide a convenient and inexpensive means for doing precisely this.

2. Description of the Prior Art

Devices for cutting cylindrical articles such as window shades are presently known. For example, a commonly used window shade cutter employed at locations where window shades are sold, includes a motor driven spindle that rotates a cutter about the shade. Alternatively, the shade may be rotated relative to the cutter. Such devices are relatively complicated and expensive and therefore are unsuitable for purchase and use by home owners.

A portable window shade cutter is disclosed in U.S. Pat. No. 2,615,516 (Hyde) and includes a tube for receiving the window shade and a cutting device which includes a pistol grip and a thumb pressure plate. While the pressure plate is depressed to drive the point of the knife blade toward the axis of the tube, the tube is rotated with a shade mounted therein to effect the cutting action. The Hyde device has several disadvantages. In particular, manual pressure must be applied to its components in order to move the blade into cutting engagement with the shade. The shade is rotated relative to the blade which is held in an angularly stationary position. Therefore, because of this physical arrangement, rotation of the tube and shade is interrupted when the operator repositions his had on the tube. Moreover, the shade can be rotated in the wrong direction relative to the blade and therefore can foul. It is also difficult to see the cut line which results from operation of the device and, accordingly, is difficult for an operator to monitor his work.

The device for cutting a cylindrical article of the present invention is intended to correct these drawbacks.

SUMMARY OF THE INVENTION

In a preferred embodiment, to be described below in detail, the device of the present invention for cutting a cylindrical article utilizes a continuous cutting action to sever an article such as a window shade. The device may be operated in only one manner and is designed to automatically effect the cutting action without additional manual pressure on any blade when operated. Further, the operator has a good view of his work so that he may monitor operation of the device. In addition, the device of the present invention is elegant in its simplicity, may be easily operated by an unskilled person, and may be manufactured economically enough to permit its use in the home.

In its preferred embodiment, the device of the present invention comprises a tubular support sized to encircle the cylindrical article to be cut. A guide is mounted with the support for rotation about the support axis and has an outwardly projecting arm formed to be engaged by the device operator. A cutting member in the form of a knife blade having a cutting edge is mounted in the guide for movement from a first position with the cutting edge tangentially intersecting the tubular section defined by the support to a second position with the cutting edge chordally intersecting the tubular section. A spring is mounted to urge the knife edge from its first to its second position when the guide is rotated about the support.

The tangential and chordal alignment of the cutting edge of the blade with the cylindrical article being cut provides substantial benefits. In particular, as the blade begins to cut into the cylindrical article, it is automatically guided within the cut to complete its operation. The guide is also constructed so that the blade reciprocates in a plane that coincides with that cut in the window shade. Further, the outwardly projecting arm on the guide is designed so that it may be rotated in only one direction to ensure proper cutting operation and to prevent binding and fouling of the blade.

The device of the invention is designed so that the tubular support is held stationary relative to the window shade being cut while the guide is rotated thereabout and the blade is automatically urged to its second position. Because of this arrangement, the guide may be rotated by a user's free hand, opposite that which holds the support and window shade, in a continuous motion. Specifically, in the preferred embodiment, the arm is equipped with a finger ring engageable by the operator's finger to exert force in only one circumferential direction to permit easy and continuous operation.

In its preferred form, the device of the present invention has relatively few parts which may be economically manufactured so that the device may be sold with window shades for convenient use in the home.

Accordingly, it is an object of the present invention to provide a device for cutting a cylindrical object such as a window shade which is simple, economical, and easy to operate. It is a further object of the invention to provide a device which may be used at the point of shade installation and may be constructed cheaply enough to permit its purchase at the time of shade purchase.

Other objects, aspects, and advantages of the present invention will be pointed out in or will be understood from the following detailed description provided below in conjunction with the accompanying drawings.

DESCRIPTION OF THE PREFERRED EMBODIMENT

Figure 1:
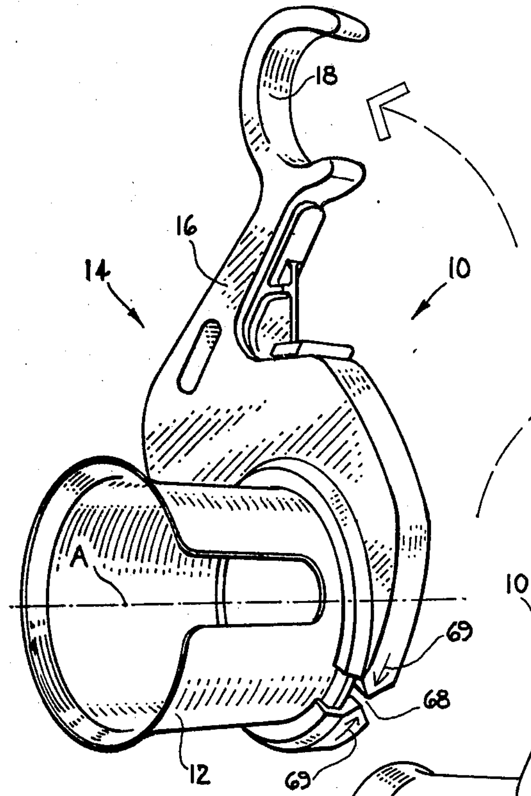
FIG. 1 is a perspective view taken from the rear of the device of the present invention for cutting a cylindrical article. The tubular support is illustrated in detail.
Figure 2:
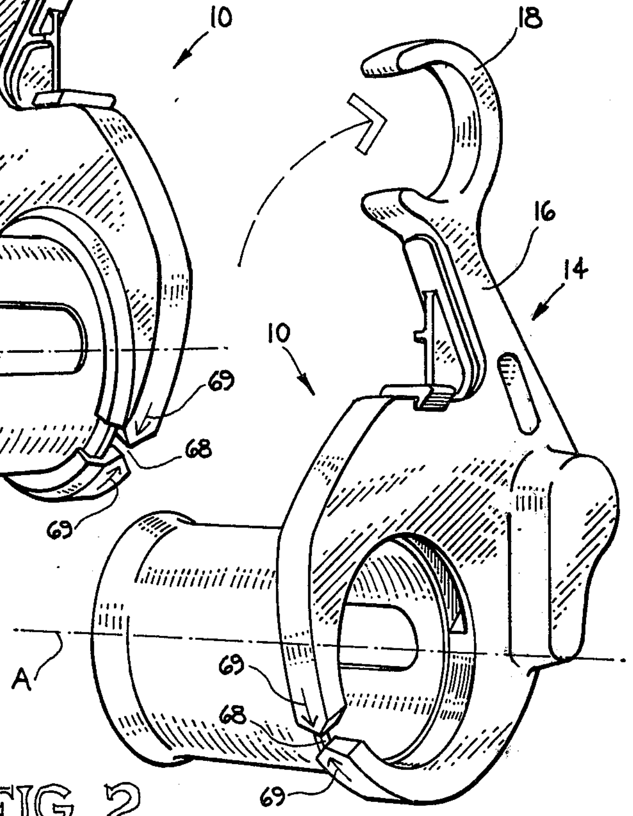
FIG. 2 is a second perspective view of the device of the present invention taken from the front illustrating the guide in detail.

As shown in FIGS. 1 and 2, the device of the present invention, generally indicated at 10, for cutting a tubular article, comprises a tubular support 12 which has an inside diameter larger than the outside diameter of the cylindrical object to be cut. For example, as shown in FIG. 3, if the device is to be used to cut a window shade, the tubular support 12 should have an inside diameter larger than the outside diameter of the rolled shade.

The device 10 further comprises a guide, generally indicated at 14, that is mounted with the tubular support for rotation about the support axis A in a manner to be described in greater detail below. The guide includes a generally radially outwardly projecting arm 16 that terminates in a C-shaped ring 18 at a significant distance from the axis A. As can be seen in FIG. 3, the ring 18 is adapted to receive the finger of a user's hand so that the guide may only be rotated in a clockwise direction relative to the support. This is particularly important if the device is designed to cut window shades which are rolled in accordance with the convention shown in FIG. 3 with the shade motor M positioned at the end of the shade opposite that being cut. However, if the device is intended to cut other cylindrical objects, it may be designed so that the guide rotates in a counterclockwise direction.

Figure 3:
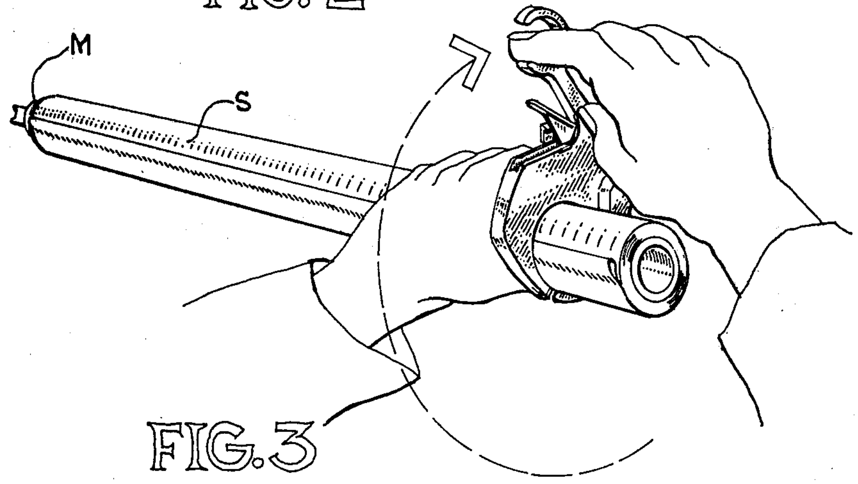
FIG. 3 is a perspective view showing operation of the device to cut a conventional window shade.

It will be appreciated from FIG. 3 that in order to operate the device of the present invention, the cylindrical article such as a window shade is inserted into the tubular support 12 and is grasped by the user's left hand. The guide may then be continuously rotated by engaging a finger of the user's right hand in the ring 18 and driving it in a clockwise direction.

Referring now to FIGS. 4 through 7 which illustrate the device of the present invention in greater detail, it can be seen that the tubular support is truncated at its right-most end (FIG. 5) along a plane 20 that is perpendicular to the support axis A. An annular rib 22 is formed on the exterior of the support adjacent the truncating plane 20. The left-most end of the tubular support 12 is fluted or has a conical shape 24 to ease insertion of the cylindrical article in it.

The guide 14 is formed in two sections 26 and 28, joined by any suitable means along a mating line 29, which together have an opening 31 that is slightly larger than and concentric with the opening in the tubular support. The left-most section 26 is formed with a short tubular extension 30 that defines an annular groove 32 which mates with the annular rib 22. Accordingly, the guide section 26 and those components assembled with it may be rotated relative to the tubular section 12 with the rib 22 engaged in the groove 32.

The other guide section 28, shown in detail in FIGS. 4, 5, 6, and 7, is formed with a partially circular groove 34, at the base of arm 16, that extends laterally into a bulged housing 35 on the outside of section 28. The groove 34 accommodates a C-shaped finger 36 formed on a blade mounting member 38. A larger main depression 39 formed in the interior of section 28 compliments a second main depression 41 formed on the interior of section 26 to accommodate movement of the member 38. Accordingly, the member 38 may be pivoted from a first position shown in FIG. 4 to a second position shown in FIG. 6. Movement is limited at the second position by interengagement of a tab 43 extending from the member 38 with the boundary 45 of main depressions 39 and 41.

The guide section 28 is also formed with a linear depression 40 and a spring mounting post 42. The blade mounting member 38 is formed with a complementary linear depression 44. Accordingly, a coil spring 46 may be mounted on the pin 42 with opposing legs 47 and 49 positioned in the respective depressions 40 and 44. The spring is constructed to urge the member 38 toward its second position shown in FIG. 6.

Figure 4:
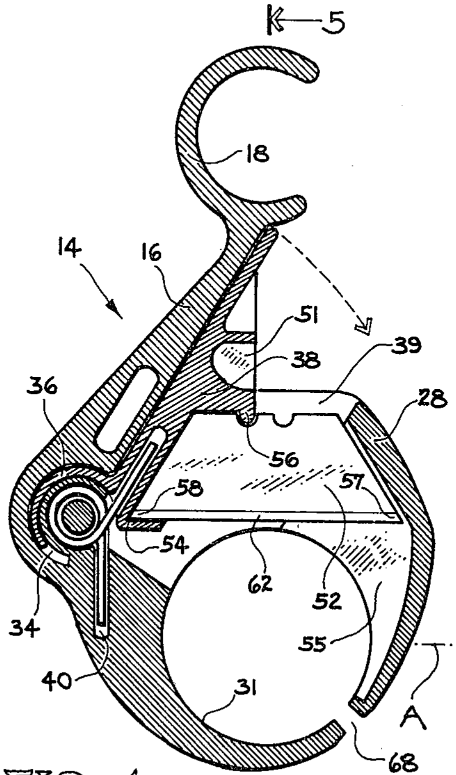
FIG. 4 is a vertical cross-sectional view taken through plane 4—4 in FIG. 5 looking toward the right showing the guide and blade mount in detail.
Figure 5:
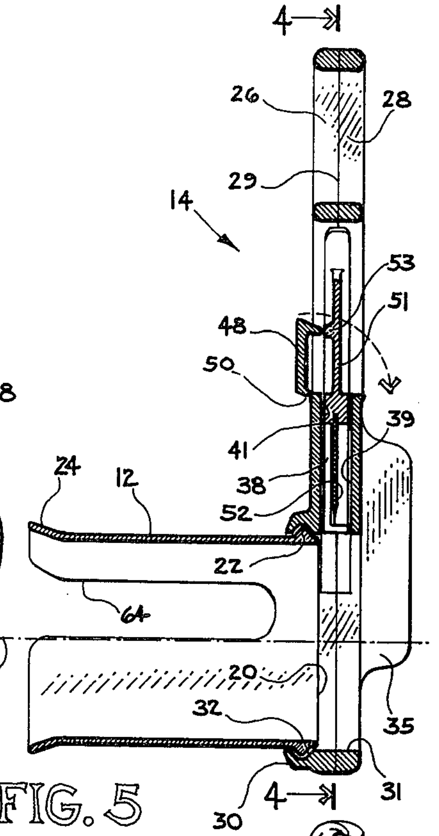
FIG. 5 is a vertical cross-sectional view taken through plane 5—5 in FIG. 4 looking toward the left showing the knife in the first position.

The mating guide section 28 is formed to be attached to the first guide section 26 to enclose the blade mounting member 38 as shown in FIG. 5. Moreover, the first section 26 is formed with a retaining tab 48 that is joined thereto by an intergral flexible hinge 50. When closed downwardly into engagement with the second tubular section 28 in front of a web 51 formed on the blade mounting member 38 as indicated by the arrow in FIG. 5, the tab 48 retains the blade mounting member in its first position as shown in FIG. 4, against the urging of spring 46.

The tab may be opened however, as shown in FIG. 5, and can be provided with a catch (not shown) to hold it away from the member 38. Alternatively member 38 can be formed with a sidewardly projecting rail 53 against which the tab may freely slide. As can been seen in FIGS. 4, 6 and 7, the blade mounting member is shaped to receive a conventional shingle knife-type blade 52 and has a notch 54 and a complementary lug 56. One point 58 of the blade mates with the notch 54 and one cut out portion 60 of the blade 52 mates with the lug 56.

Figure 6:
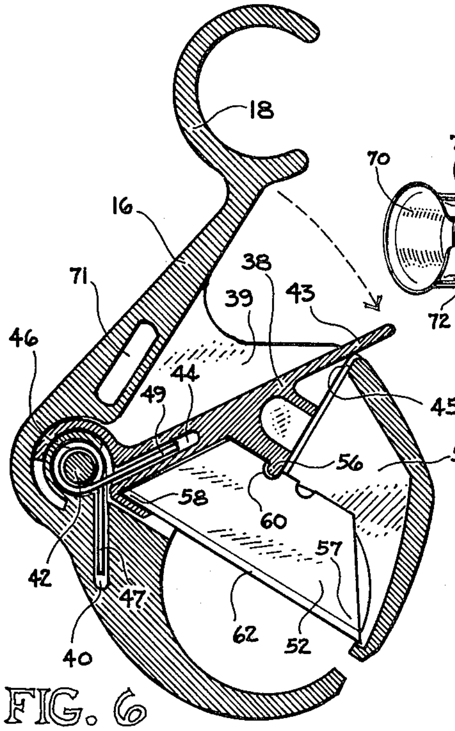
FIG. 6 is a vertical cross-sectional view similar to that shown in FIG. 4 with the knife reciprocated to its second position after a cut has been completed.

The blade 52 desirably has a hollow ground, symmetrically honed cutting edge 62. As can be seen in FIG. 4, in the first position, the cutting edge 62 extends tangentially to the cylinder defined by the opening in the guide and by the tubular support 12. Similarly, as shown in FIG. 6, when the blade is urged to its second position as shown in FIG. 6, the blade edge 62 chordally intersects the cylinder defined by the opening and tubular section support 12. Accordingly, the blade edge will cut a cylindrical article on which it operates at a very gentle angle. There is little chance the blade will shift or foul during operation. In addition, by comparing FIGS. 4 and 6, it can be seen that the locations on blade edge 62 where cutting takes place constantly change as the blade moves from its first to its second position. This feature extends blade life.

As can be seen in FIG. 5, the blade 52 is mounted to reciprocate as described above essentially in the plane defined by the truncated end 20 of the support 12. Accordingly, the blade may move downwardly near the edge of the support. The guide sections 26 and 28 also define a slot 55 only slightly wider than blade 52 to constrain movement of its free point 57, and, therefore, the entire blade to the desired plane. Further, it can be appreciated that the C-shaped ring 18 is positioned so that when the guide is rotated, the knife is drawn toward its point of attachment with the guide. This is the preferred motion for operation of the device since it, too, minimizes the chances of blade binding or fouling.

The support may be formed with an enlarged slot 64 which permits it to be circumferentially collapsed into tight interengagement with the shade being cut. Moreover, the enlarged slot may be sufficiently wide to permit friction from the user's hand to tightly hold the shade against rotation in the support.

It will be understood that for heavy duty applications the device of the invention can be adapted to receive replacement blades.

The guide 14 is also formed with a gap 68 that permits at least a portion of the outer surface of the shade to be viewed. The gap may be provided with molded arrows 69 that indicate the line on which the article is being cut. This feature permits the operator to have complete control over the location where the cut will be made and to observe the cut while it is being made. Moreover, an elongated hole 71 can be formed in the guide for providing a sharp edge against which the wooded weighting slat of a window shade may be broken.

Figure 8:
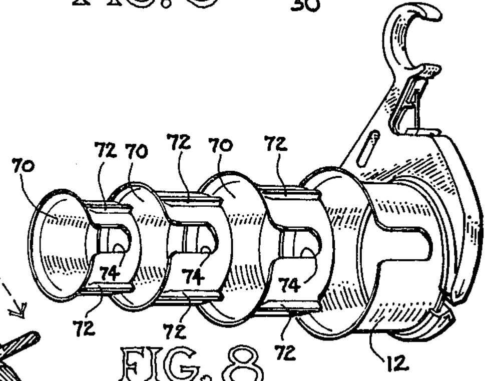
FIG. 8 is a perspective view showing a series of adapter rings for sizing the tubular support to cut various sizes of cylindrical articles.
Figure 7:
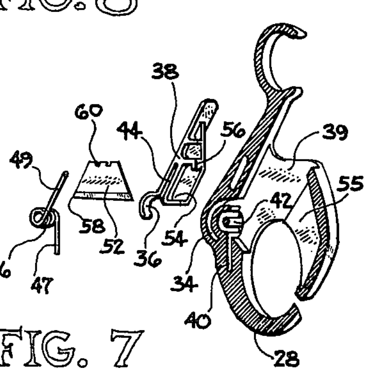
FIG. 7 is an exploded perspective view of several components of the device.

As shown in FIG. 8, the device of the present invention may be equipped with extra pieces to permit cutting of smaller cylinders. These pieces are in the form of concentric tubular adaptor rings 70 shaped to be inserted into the support 12. Enough rings 70 are installed in the support until the last installed ring has only a slightly larger diameter than the article being cut.

Each ring may be equipped with at least three axially extending spacer ribs 72 to reduce the number of rings 70 required to achieve the desired support size. Also each ring may be formed with an axially extending slot 74 to permit its circumferential collapse into tight engagement with the article being cut.

It will be readily appreciated from the description provided above that the apparatus of the present invention is relatively simple. All parts, with the exception of the blade and spring, may be molded using conventional techniques from materials such as plastic. The blade may be of the shingle knife type available from Stanley Tools, a Division of The Stanley Works, New Britain, Connecticut, having Part No. 1991 or 1992. Moreover, the apparatus is simple to use and operate. It has been found that a conventional shade may be cleanly cut with as few as five turns of the guide housing when the blade is sharp.

Although a specific embodiment of the present invention has been described above in detail, it is to be understood that this is for purposes of illustration. Modifications may be made to the structure described in order to adapt this cutting tool to particular applications for cutting cylindrical articles.

What is claimed is:

1. A device for cutting a cylindrical article such as a window shade or the like, comprising:

A. tubular support means for encircling the article in non-rotative relation thereto;

B. guide means, including 1. a guide housing mounted with said support means for continuous rotation relative thereto about the axis thereof and, therefore, about a cylindrical article encircled in non-rotative relation by said support means, said guide housing defining a blade guiding slot which constitutes a plane extending perpendicularly to the axis of said support means; and 2. a blade mounting member mounted for pivoted movement in said housing about a pivot point;

C. a planar blade, having a cutting edge of length sufficient to diametrically span said tubular support, mounted at one end of said cutting edge on said blade mounting member to be cantilevered from said pivot point, the opposite end of said cutting edge being guided and confined in said blade guiding slot, said blade mounting member being arranged to thereby mount said blade for pivoted movement about said pivot point from a first position with said cutting edge tangentially intersecting the tubular section defined by said support means to a second position with said cutting edge extending completely across and chordally intersecting the tubular section, the plane of said blade being constrained to lie substantially parallel to the plane constituted by said slot;

D. means for urging said blade mounting member to pivot said blade from said first to said second position while said guide housing is rotated about said support means; and E. an arm, projecting generally radially outwardly from and secured to said guide housing, having engagement means, engageable by an operator to rotate said guide housing and draw said cutting edge of said blade about the cylindrical article in a circular direction following said pivot point.

2. The cutting device as claimed in claim 1 wherein said tubular support means comprises a tube formed with at least one slot that permits said tube to be circumferentially collapsed into tight interengagement with an article which it encircles.

3. The cutting device as claimed in claim 1 wherein one of said support means and guide housing is formed with an annular rib and the other is formed with an annular groove slidably interfittable with said rib to permit rotation of said guide housing relative to said support means.

4. The cutting device as claimed in claim 1 wherein said guide means is mounted at one extreme of said support means, said blade being mounted for movement from the first to the second position in a plane adjacent said one extreme which thereby acts to stabilize said blade during said movement.

5. The cutting device as claimed in claim 1 wherein said urging means is a spring mounted to pivot said blade mounting member.

6. The cutting device as claimed in claim 1 further comprising:

restraining means for holding said blade with its cutting edge in the first position.

7. The cutting device as claimed in claim 1 wherein said engagement means of said arm is a ring having an opening that permits said guide means to be rotated through said ring in only one angular direction.

8. The cutting device as claimed in claim 1 further comprising:

means for adjusting the size of said tubular support means to accommodate cylindrical articles of various sizes.

9. The cutting device as claimed in claim 8 wherein said adjusting means comprises at least one tubular adaptor ring mountable inside said tubular support.

10. The cutting device as claimed in claim 9 wherein said adaptor ring is provided with at least three generally axially extending spacer ribs engageable on the inside of said tubular support.

11. The cutting device as claimed in claim 1 further comprising:

indicator means for indicating the location of a cut made by said cutting means.

12. The cutting device as claimed in claim 1 further comprising:

bearing means against which a window shade weighting slat may be broken.

* * * * *